United States Patent
Matheny, Jr.

[11] 3,897,984
[45] Aug. 5, 1975

[54] ADJUSTABLE RESILIENT SUPPORT APPARATUS

[75] Inventor: Jesse E. Matheny, Jr., Decatur, Ill.

[73] Assignee: Caterpillar Tractor Co., Peoria, Ill.

[22] Filed: June 24, 1974

[21] Appl. No.: 482,516

[52] U.S. Cl. .................................. 308/62; 74/574
[51] Int. Cl.² ........................................ F16C 35/04
[58] Field of Search ............ 308/15, 22, 26, 27, 58, 308/62; 74/574, 570

[56] References Cited
UNITED STATES PATENTS

| | | | |
|---|---|---|---|
| 2,652,700 | 9/1953 | Seibel | 74/574 X |
| 3,306,680 | 2/1967 | Bruyere | 308/26 X |
| 3,318,410 | 5/1967 | Johnson et al. | 308/26 X |
| 3,497,164 | 2/1970 | Horak | 74/574 X |
| 3,704,922 | 12/1972 | Kleinschmidt et al. | 308/26 |

*Primary Examiner*—Lloyd L. King
*Assistant Examiner*—Michael Mar
*Attorney, Agent, or Firm*—Phillips, Moore, Weissenberger Lempio & Strabala

[57] ABSTRACT

Apparatus for controlling oscillation of a power transmitting shaft rotatably supported by first and second spaced-apart shaft supports comprises a third shaft support. The third shaft support is positioned between the first and second shaft supports and includes a support body. A resilient generally annular member having an offset inner periphery is associated with the support body for exerting a radial preload force on the shaft, and the magnitude of the radial preload force on the shaft may be varied through rotation of the generally annular member.

9 Claims, 3 Drawing Figures

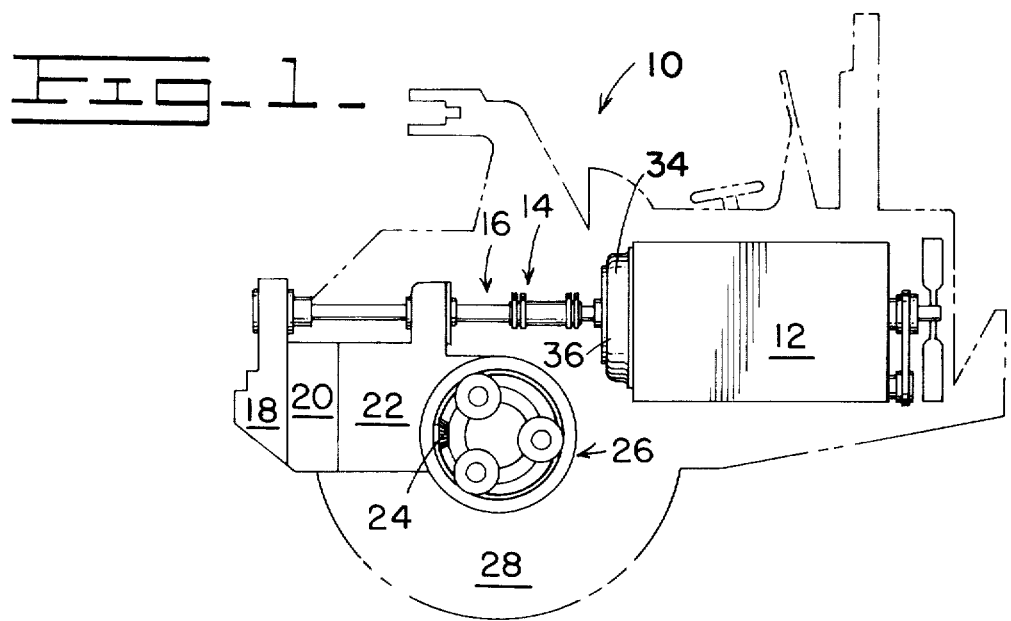
Fig-1-
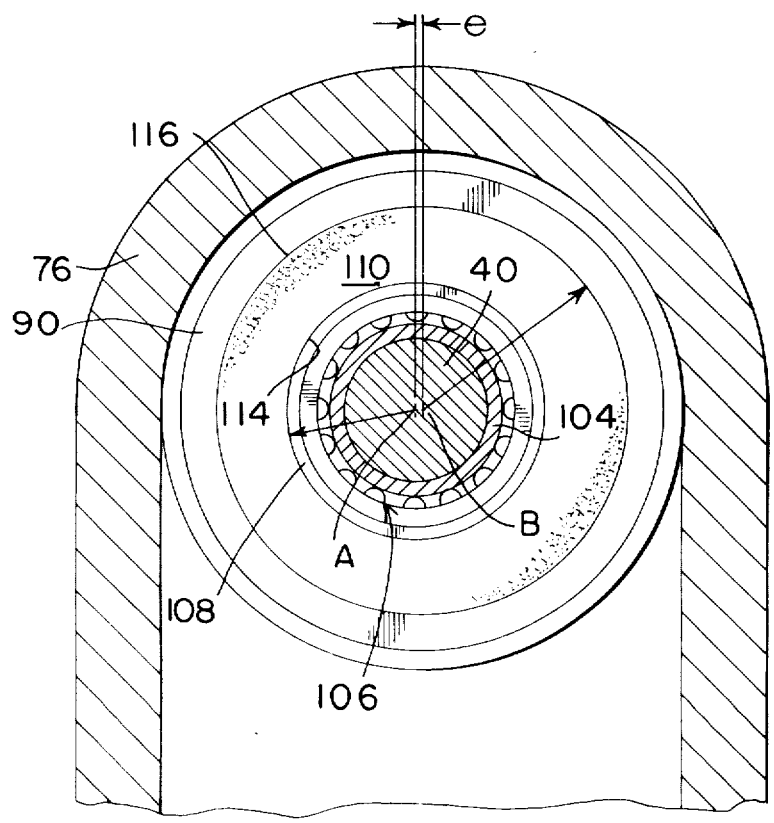
Fig-3-

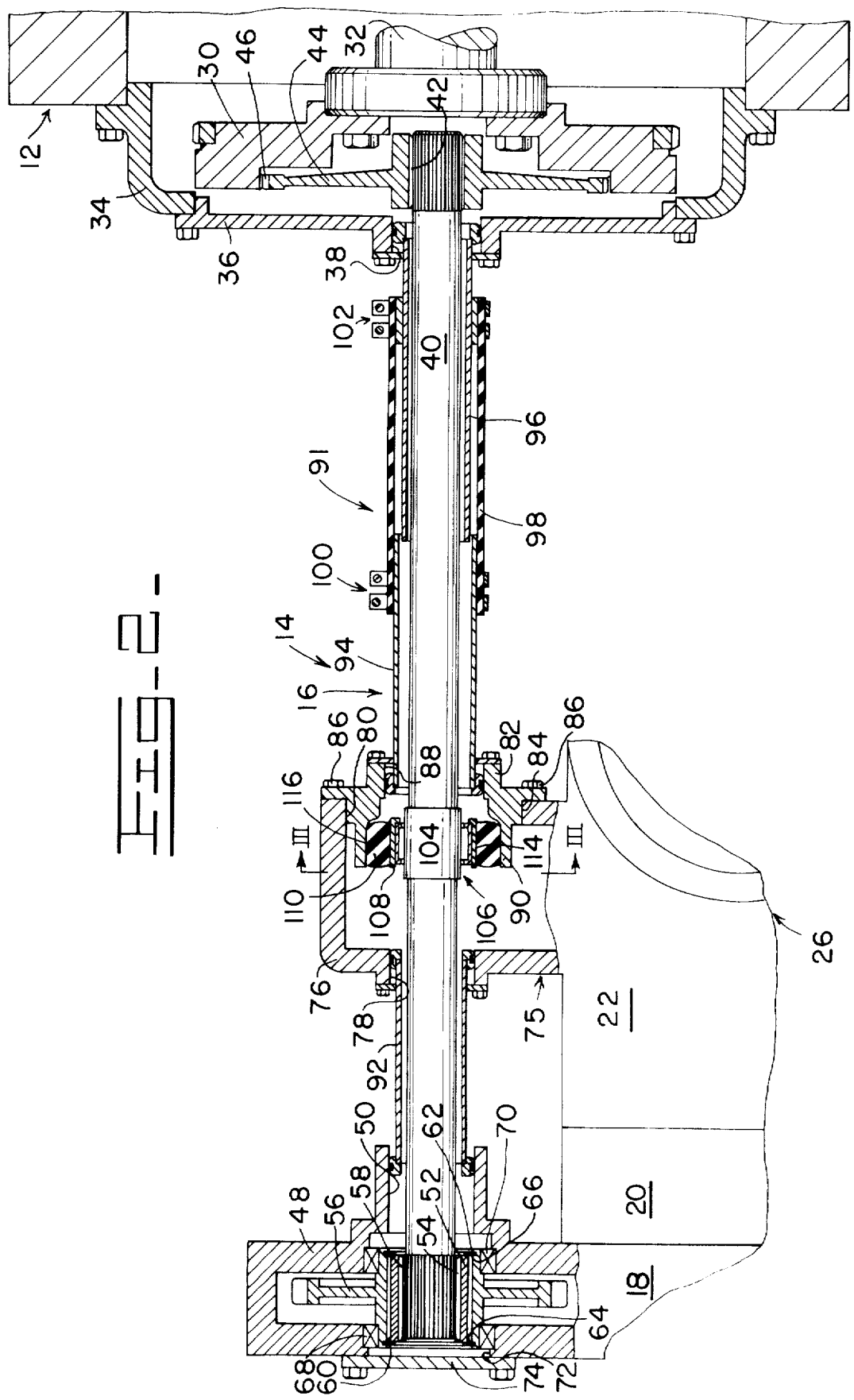

ADJUSTABLE RESILIENT SUPPORT APPARATUS

BACKGROUND OF THE INVENTION

This invention relates to torque power transmitting shafts and apparatus to control undesirable harmonic oscillation thereof, and more particularly to apparatus wherein a shaft support is generally positioned intermediate the shaft length and includes a generally annular resilient member having inner and outer generally circular circumferential surfaces, the centers of which are spaced apart. In the use of a drive shaft on, for example, a tractor for transmitting power from the engine to a transfer gear box, it is conventional practice to provide a relatively large, stiffly supported and complex drive shaft assembly, utilizing a pair of U-joints for misalignment purposes. To eliminate the expense of providing such U-joints, a relatively flexible drive shaft may be used which is capable of accepting a degree of misalignment which might occur between the engine and transfer gear box. However, because of the length of such drive shaft, such shaft must be supported adjacent its center to prevent it from whirling at a critical speed within the normal operating range of the vehicle. To obtain maximum life from a needle roller bearing used to rotatably mount the drive shaft in the center support, it has been found necessary that such bearing be operated under a proper radial load. Just as too great a radial load is detrimental to a bearing's life, too little or no radial load is likewise detrimental because it may permit the rollers of the bearing to slide rather than roll in operation. Either of these conditions is possible in the bearing of such a center support, depending upon the degree of concentricity in a particular vehicle between a drive shaft and the structure to which the center support is mounted. If there exists a large amount of misalignment, the center support bearing will have to support a relatively large radial load because of force necessary to cause the radial deflection of the shaft. Conversely, if the centerlines of the drive shaft and the center support structure are in substantial alignment, the center support bearing will have to support a relatively small radial load allowing the rollers thereof to slide.

Of general interest in this area are U.S. Pat. No. 3,639,015 to Maas, U.S. Pat. No. 3,420,072 to Baier et al., U.S. Pat. No. 2,906,572 to Wroby, U.S. Pat. No. 3,704,922 to Kleinschmidt et al., U.S. Pat. No. 3,292,389 to Abloff et al., and U.S. Pat. No. 3,531,949 to Downey.

SUMMARY AND OBJECTS OF THE INVENTION

Accordingly, an object of this invention is to provide a lighter, more effective, inexpensive and easy to manufacture adjustable resilient support apparatus for machines utilizing at least one power communicating shaft, which shaft encounters various harmonic oscillation tendencies at various operational speeds.

Another object of this invention is to provide adjustable resilient support apparatus to control undesirable oscillation of a relatively flexible driveshaft, the apparatus being adjustable to obtain the proper operating radial load on a roller bearing of the support body.

Broadly stated, this invention comprises apparatus for controlling oscillation of a shaft rotatably supported by first and second spread-apart shaft support means comprising a third shaft support means. The third shaft support means are positioned between the first and second shaft support means and include a support body. Means are associated with the support body for exerting a radial preload force on the shaft, and means are associated with the support means for selectively varying the magnitude of the radial preload force on the shaft.

BRIEF DESCRIPTION OF THE DRAWINGS

Other objects of this invention will become apparent from the following description and drawings, wherein:

FIG. 1 is a longitudinal view of a motor vehicle incorporating the preferred embodiment of the invention;

FIG. 2 is an elevated cross-sectional view of the motor vehicle drive train of FIG. 1 incorporating the preferred embodiment of the invention; and FIG. 3 is a cross-sectional view of a portion of the apparatus of FIG. 1 illustrating the preferred embodiment of the invention, taken along line III-III of FIG. 2.

DESCRIPTION OF THE PREFERRED EMBODIMENT

Referring to FIG. 1, a motor vehicle 10 is motivated in well-known fashion by means of an engine 12 and power train 14 which transmits motive power under selective operator control to a driveshaft assembly 16, a transfer gear box 18, then to a torque converter 20, and through a transmission 22 on to a differential 24 and a final drive assembly 26 to be communicated to a work surface by means of a ground engaging means 28.

As best shown in FIG. 2, the engine 12 includes a flywheel 30 rotatably secured to the rear end of engine crankshaft 32. The flywheel 30 is enclosed by a housing 34 having a cover 36 attached thereto. The cover 36 is provided with an annular opening 38, through which a flexible drive shaft 40 of the drive shaft assembly 16 is disposed. A spline connection shown at 42 couples one end of the shaft 40 to a hub 44 which in turn is coupled to the flywheel 30 by a spline connection shown at 46. Through such described support means, this one end of the shaft 40 is rotatably supported.

The opposite end of the shaft 40 is received in a housing 48 of the transfer gear box 18 through an opening 50 formed therein. This end of the shaft 40 is coupled to a sleeve 52 by a spline connection shown at 54. The sleeve 52 is exteriorly coupled to an input gear 56 by a spline connection shown at 58. A pair of snap rings 60,62 are mounted within grooves 64,66 formed in the gear 56 for the axial retention of the sleeve 52. A pair of bearings 68,70 rotatably mount the gear 56 to the housing 48. An opening 72 which is normally closed by a cover 74 is formed in the opposite side of the housing 48 for permitting the insertion of the drive shaft 40 therethrough for assembly purposes. Through such means, the other end of the drive shaft 40 is rotatably supported.

The transmission 22 includes a housing 75 having an upward extension 76 formed thereon and positioned between the opposite ends of the drive shaft 40. The extension 76 is provided with first and second openings 78,80 formed on the opposite sides thereof for permitting positioning of the drive shaft 40 through such upward extension 76. The extension 76 comprises a support frame for a bearing cage 82, which has an outer diameter portion 84 piloted within the opening 80 of the extension 76. The bearing cage 82 is secured to the extension 76 by a plurality of bolts 86 which are arranged in an equally spaced pattern about the periphery of the opening 80 to permit the attachment of the cage 82 in any of numerous angular positions relative to the extension 76. The bearing cage 82 is also provided with a bore 88, and a ring portion 90 formed in axial alignment with the central axis of the cage 82.

The drive shaft assembly 16 also includes a protective enclosure 91 including a first tube 92, circumposed drive shaft 40 between the gear box housing 48 and the upward extension 76. The opposite ends of the tube 92 are sealingly piloted with the openings 50,78 of the gear box housing and the upward extension, respectively. The protective enclosure 91 also includes a pair of tubes 94,96 which circumpose the drive shaft 40 between the upward extension 76 and the flywheel housing cover 36. The remote ends of the tubes 94,96 are respectively sealingly piloted with the bore 88 of the bearing cage 82 and the opening 38 of the flywheel cover 36. The opposite end of the tube 96 is telescopically received within the adjacent end of the tube 94. The adjacent ends of the tubes 94,96 are sealed by a section of hose 98 disposed therearound and having its opposite ends individually secured to the tubes by conventional hose clamps 100,102.

A sleeve 104 is press fitted onto a portion of the drive shaft 40 adjacent the bearing cage 82 to function as an inner race for a needle roller bearing 106 mounted therearound. The bearing 106 is mounted within a sleeve 108. A generally annular resilient (i.e., for example, rubber) member 110 defines a bore having a circular inner circumferential surface 114 secured to the sleeve 108 by bonding with any suitable adhesive. The shaft 40 is disposed through such circular inner circumferential surface 114. The generally annular member 110 also defines a circular outer circumferential surface 116, of somewhat greater diameter than that of the inner surface of the ring portion 90 within which the member 110 is disposed, so that the member 110 is radially compressed to an extent thereby. Such means, including the generally annular member 110, act as shaft support means positioned between the shaft support means associated with the ends of the shaft 40.

As best shown in FIG. 3, the centers A and B of the respective circular inner and outer circumferential surfaces 114,116 are spaced apart or offset by a predetermined distance "e" which is the distance calculated that the drive shaft 40 must be radially deflected to provide the minimum radial load on the bearing 106 which will insure continuous rolling of its rollers in operation.

In operation, if the center axis of the bearing cage 82 happens to be exactly aligned with the rotational axis of the drive shaft 40, the eccentricity of the resilient member 110 will force the drive shaft 40 out of alignment to provide a preradial load on the bearing 106. If it is desired that the magnitude of such radial preload force on the shaft 40 be adjusted, the mounting bolts 86 can be removed, and bearing cage 82 rotated to a particular angular position which will provide the desired radial preload on the bearing 106. During such adjustment, the generally annular member 110 is rotated about the center B of the circular outer circumferential surface 116 thereof relative to the extension 76, and the annular member 110 may be fixed in a chosen rotative position relative to the extension 76 by replacement of the bolts 86. The radial preload force is applied to the shaft 40 through the roller bearing 106, which is disposed about the shaft 40.

Through such means, it will be understood that proper operating radial load may be applied to the roller bearing 106. The member 110, being of resilient material, acts to dampen shaft vibrations. It will also be seen that the means for applying such radial load are relatively easy to manufacture, assemble and service. Additionally, such structure is lighter, more reliable and has fewer components than conventional support arrangements.

What is claimed is:

1. Apparatus for controlling oscillation of a shaft rotatably supported by first and second spaced-apart shaft support means, said apparatus comprising:
   third shaft support means positioned between the first and second support means and comprising a support body,
   means associated with said support body for exerting a radial preload force on said shaft, and
   means associated with said support means for selectively varying the magnitude of said radial preload force on said shaft.

2. The apparatus of claim 1 wherein the means for exerting the radial preload force comprise a generally annular member mounted relative to the support body and defining a bore having a circular inner circumferential surface through which the shaft is disposed, and defining a circular outer circumferential surface, and wherein the centers of said circular inner and outer circumferential surfaces are spaced-apart.

3. The apparatus of claim 2 wherein the means for selectively varying the magnitude of said radial preload force comprise means for selectively allowing rotation of the generally annular member about the center of the circular outer circumferential surface thereof relative to the support body, and selectively securing said generally annular member in a chosen rotative position relative to the support body.

4. The apparatus of claim 3 wherein the generally annular member comprises a resilient member.

5. The apparatus of claim 4 wherein the support body comprises a support frame and a flange defining a ring portion within which the generally annular member is disposed, the generally annular member being radially compressed to an extent thereby, said flange being selectively rotatably mounted to the support frame to in turn rotate the generally annular member about the center of the outer circumferential surface thereof, and selectively securable in a chosen position.

6. The apparatus of claim 1 and further comprising roller bearing means associated with the support body and shaft, and disposed about the shaft, and through which the radial preload force is applied to the shaft.

7. The apparatus of claim 6 wherein the means for exerting the radial preload force comprise a generally annular member mounted relative to the support body and defining a bore having a circular inner circumferential surface through which the shaft is disposed and in which is disposed the roller bearing means, said generally annular member defining a circular outer circumferential surface, and wherein the centers of said inner and outer circumferential surfaces are spaced apart.

8. The apparatus of claim 7 wherein the means for selectively varying the magnitude of said radial preload force comprise means for selectively allowing rotation of the generally annular member about the center of the circular outer circumferential surface thereof relative to the support body.

9. The apparatus of claim 8 wherein the generally annular member comprises a resilient member.

* * * * *